United States Patent
Park

(10) Patent No.: US 11,440,503 B2
(45) Date of Patent: Sep. 13, 2022

(54) VEHICLE TERMINAL AND CONTROL METHOD OF TRANSPORTATION SYSTEM INCLUDING SAME

(71) Applicant: LG Electronics Inc., Seoul (KR)

(72) Inventor: Minsick Park, Seoul (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 16/965,884

(22) PCT Filed: Apr. 11, 2018

(86) PCT No.: PCT/KR2018/004229
§ 371 (c)(1),
(2) Date: Jul. 29, 2020

(87) PCT Pub. No.: WO2019/151575
PCT Pub. Date: Aug. 8, 2019

(65) Prior Publication Data
US 2021/0039596 A1 Feb. 11, 2021

(30) Foreign Application Priority Data
Jan. 30, 2018 (KR) .......... 10-2018-0011568

(51) Int. Cl.
*B60R 25/25* (2013.01)
*B60R 25/24* (2013.01)
(Continued)

(52) U.S. Cl.
CPC .......... *B60R 25/24* (2013.01); *B60R 25/10* (2013.01); *B60R 25/23* (2013.01); *B60R 25/252* (2013.01);
(Continued)

(58) Field of Classification Search
CPC .......... B60R 25/24; B60R 25/10; B60R 25/23; B60R 25/252; B60R 25/255; B60R 25/30; G06V 40/67
See application file for complete search history.

(56) References Cited

U.S. PATENT DOCUMENTS 6,850,153 B1 * 2/2005 Murakami .......... B60R 25/2018
340/5.2
9,235,750 B1 * 1/2016 Sutton .................... B60R 25/10
(Continued)

FOREIGN PATENT DOCUMENTS

KR  10-2004-0063245  7/2004
KR  10-2012-0057602  6/2012
(Continued)

OTHER PUBLICATIONS

KR Office Action in Korean Application No. 10-2018-0011568, dated Mar. 8, 2019, 16 pages (machine translation).

*Primary Examiner* — Nay Tun
(74) *Attorney, Agent, or Firm* — Fish & Richardson P.C.

(57) ABSTRACT

A control method of a transportation system including a mobile terminal, a vehicle, and a server. The control method of the transportation system comprises the steps of: generating a personal image including personal information of a user by the mobile terminal; generating, by the server, an authentication code of the user by using the personal image received from the mobile terminal; generating a passenger image including personal information of a passenger by the vehicle; and when the passenger image matches the authentication code, granting, by the vehicle, authority to use the vehicle to the passenger.

18 Claims, 15 Drawing Sheets

(51) Int. Cl.
  *B60R 25/10* (2013.01)
  *B60R 25/23* (2013.01)
  *B60R 25/30* (2013.01)
  *G06V 40/60* (2022.01)

(52) U.S. Cl.
  CPC ............ *B60R 25/255* (2013.01); *B60R 25/30* (2013.01); *G06V 40/67* (2022.01)

(56) References Cited

U.S. PATENT DOCUMENTS

| | | | | |
|---|---|---|---|---|
| 9,288,270 | B1* | 3/2016 | Penilla | H04L 67/10 |
| 9,355,234 | B1* | 5/2016 | Magi Shaashua | G06F 21/32 |
| 10,414,377 | B2* | 9/2019 | Hoyos | H04L 63/102 |
| 10,764,300 | B2* | 9/2020 | Maheshwari | G06F 21/45 |
| 10,778,673 | B2* | 9/2020 | Bhargava | H04L 63/083 |
| 2002/0091937 | A1* | 7/2002 | Ortiz | H04W 12/06 |
| | | | | 726/5 |
| 2007/0241861 | A1* | 10/2007 | Venkatanna | G06F 21/40 |
| | | | | 340/5.52 |
| 2008/0302870 | A1 | 12/2008 | Berini et al. | |
| 2010/0121644 | A1* | 5/2010 | Glasser | G06V 40/10 |
| | | | | 704/E15.001 |
| 2012/0053793 | A1 | 3/2012 | Sala et al. | |
| 2015/0349959 | A1* | 12/2015 | Marciniak | G06F 21/32 |
| | | | | 713/186 |
| 2015/0363986 | A1* | 12/2015 | Hoyos | H04L 63/0861 |
| | | | | 340/5.61 |
| 2016/0082926 | A1* | 3/2016 | Mouser | B60R 25/01 |
| | | | | 701/2 |
| 2017/0174180 | A1* | 6/2017 | Hoyos | B60R 25/241 |
| 2017/0332950 | A1* | 11/2017 | Yu | G06T 3/40 |
| 2018/0201226 | A1* | 7/2018 | Falkson | B60R 25/257 |
| 2019/0042866 | A1* | 2/2019 | Mostafa | G06F 21/32 |
| 2020/0356751 | A1* | 11/2020 | Matsuda | G06T 1/00 |
| 2021/0327188 | A1* | 10/2021 | Schlacks, IV | G07C 9/27 |
| 2021/0382969 | A1* | 12/2021 | Park | B60R 11/04 |

FOREIGN PATENT DOCUMENTS

| | | |
|---|---|---|
| KR | 10-2014-0128806 | 11/2014 |
| KR | 10-2015-0034336 | 4/2015 |
| KR | 10-2016-0082452 | 7/2016 |
| KR | 10-2017-0028357 | 3/2017 |
| KR | 10-2017-0111632 | 10/2017 |

* cited by examiner

FIG. 1
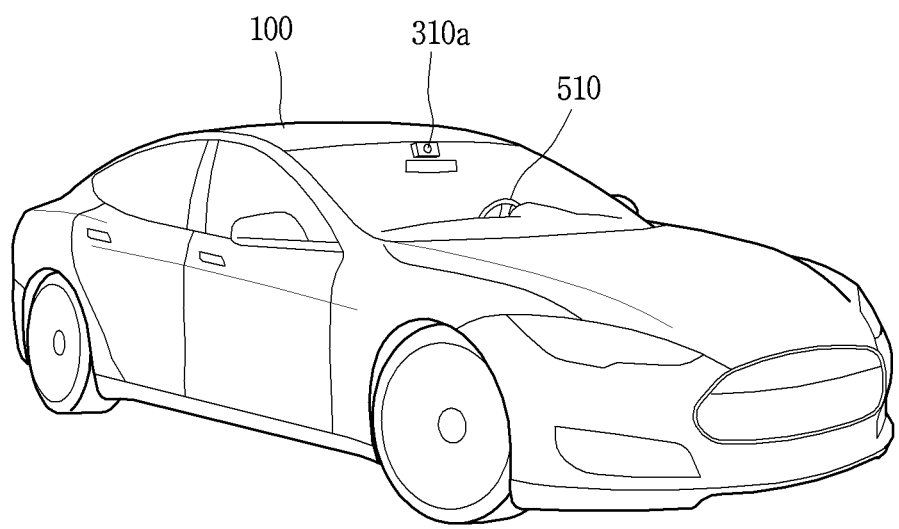
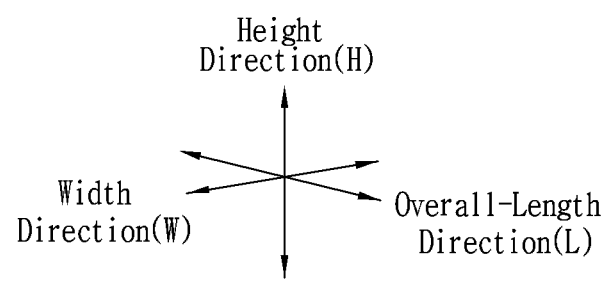

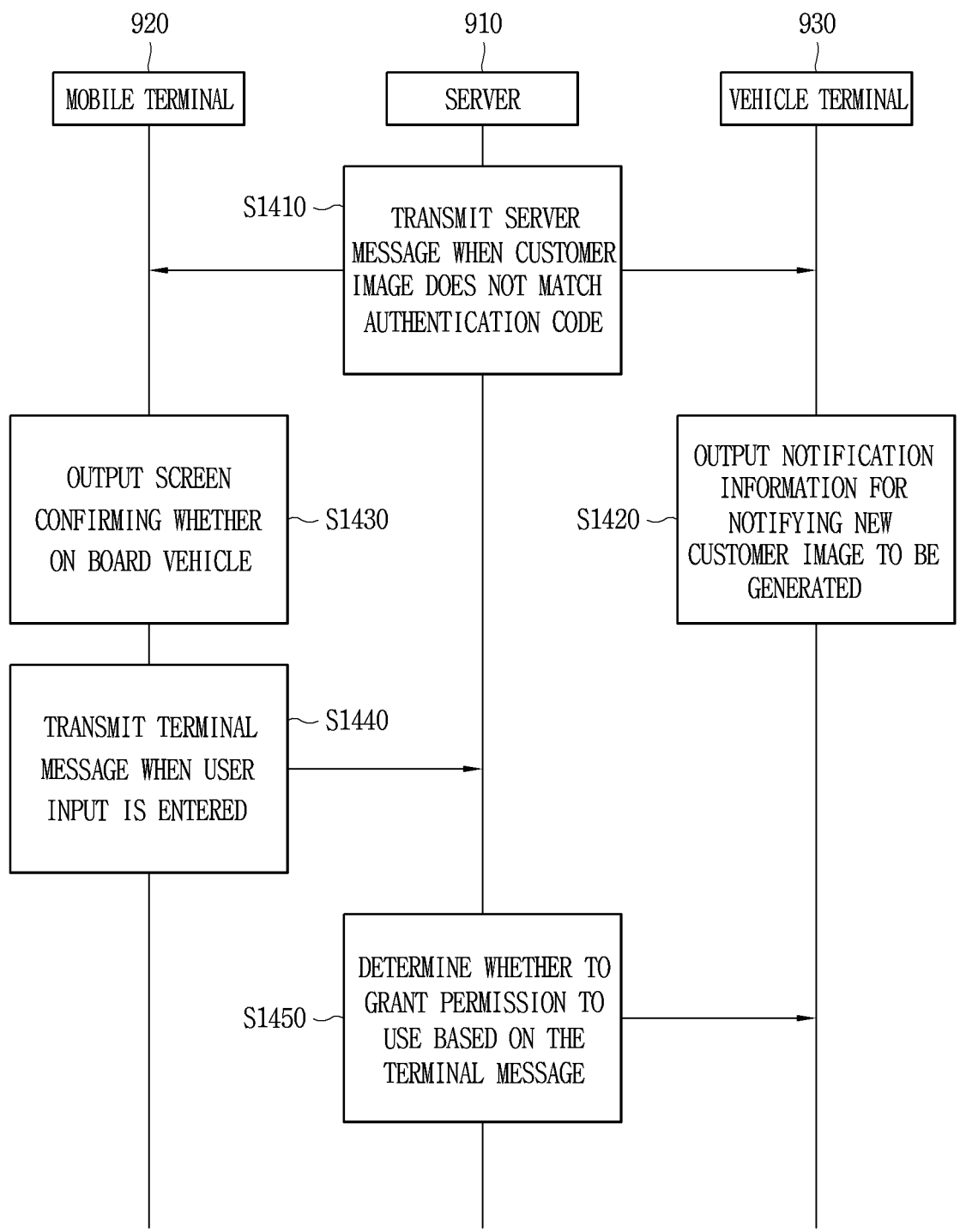

VEHICLE TERMINAL AND CONTROL METHOD OF TRANSPORTATION SYSTEM INCLUDING SAME

CROSS-REFERENCE TO RELATED APPLICATIONS

This application is the National Stage filing under 35 U.S.C. 371 of International Application No. PCT/KR2018/004229, filed on Apr. 11, 2018, which claims the benefit of earlier filing date and right of priority to Korean Application No. 10-2018-0011568, filed on Jan. 30, 2018, the contents of which are all hereby incorporated by reference herein in their entirety.

BACKGROUND

1. Technical Field

The present disclosure relates to a vehicle terminal mounted on a vehicle to generate various control commands related to the vehicle, and a control method of a transportation system including the vehicle terminal.

2. Description of the Related Art

A vehicle denotes a means of transporting people or goods using kinetic energy. Representative examples of vehicles include automobiles and motorcycles.

For safety and convenience of a user who uses the vehicle, various sensors and devices are provided in the vehicle, and the functions of the vehicle are diversified.

The function of the vehicle may be divided into a convenience function for promoting the convenience of a driver and a safety function for promoting the safety of a driver and/or a pedestrian.

First, the convenience function has a motive for development related to driver convenience, such as giving an infotainment (information+entertainment) function to the vehicle, supporting a partial autonomous driving function, or assisting the driver's vision such as night vision or blind spot. For example, the convenience function may include an active cruise control (ACC) function, a smart parking assist system (SPAS) function, a night vision (NV) function, a head up display (HUD) function, an around view monitor (AVM) function, and an adaptive headlight system (AHS) function, and the like.

The safety function is a technology for securing the safety of the driver and/or the safety of a pedestrian, and may include a lane departure warning system (LDWS) function, a lane keeping assist system (LKAS) function, an autonomous emergency braking (AEB) function, and the like.

Due to these improvements, various sharing economy services using vehicles have been developed. The sharing economy denotes a shared economy in which not only goods, but also production facilities, services or the like are borrowed and lent as needed.

A representative example to which sharing economy is applied is a transportation service. The transportation service refers to a service in which a driver moves a passenger from departure to destination using his or her own vehicle. The transportation service as a sharing economy is developing in a direction to relay any driver who is a vehicle provider and any passenger who is a vehicle user.

The transportation service is provided by a transportation system, wherein the transportation system includes a passenger terminal, a driver terminal, and a server relaying between the passenger terminal and the driver terminal.

For example, the passenger may request a vehicle to a specific point using the passenger terminal, and the server may select a driver to provide the vehicle to the passenger, and request a reservation to the driver terminal of the selected driver. The driver terminal of the selected driver provides a request from the server to the driver, thereby relaying between the passenger and the driver.

In order for the transportation service to play its role as a sharing economy, it must be developed in a direction of allowing more people to share a vehicle, in addition to simply connecting passengers and vehicles.

Furthermore, along with transportation service, various user interfaces (UIs) for providing convenience to passengers and drivers must be developed.

SUMMARY

An object of the present disclosure is to solve the foregoing problems and other problems. Another object of the present disclosure is to provide a mobile terminal capable of providing a new type of transportation service and a control method thereof. Furthermore, an object of the present disclosure is to provide a transportation system including the mobile terminal.

In addition, an object of the present disclosure is to provide a mobile terminal capable of providing convenience to a driver who provides a transportation service to a passenger, as well as providing convenience to the passenger, and a control method thereof.

According to an aspect of the present disclosure to achieve the above or other objectives, there is provided a control method of a transportation system.

A control method of a transportation system including a mobile terminal, a vehicle, and a server may include allowing the mobile terminal to generate a personal image including a user's personal information; allowing the server to generate the user's authentication code using the personal image received from the mobile terminal; allowing the vehicle to generate a passenger image including the passenger's personal information, and allowing the vehicle to grant the passenger permission to use the vehicle when the passenger image matches the authentication code.

According to an embodiment, the vehicle may be provided with a plurality of sensors capable of generating different passenger images to generate the passenger image using at least one of the sensors.

According to an embodiment, the control method of the transportation system may further include allowing the server or the vehicle to determine a scheme of generating the passenger image based on a sensor provided in the vehicle, wherein the vehicle generates the passenger image according to the determined scheme.

According to an embodiment, the vehicle may generate the passenger image using any one of the plurality of sensors based on the determined scheme, and the any one sensor may vary according to the determined scheme.

According to an embodiment, said allowing the vehicle to generate the passenger image may include generating a face image including the passenger's face; selecting any one of the plurality of sensors based on the face image; and generating the passenger image using the selected sensor.

According to an embodiment, the vehicle may control a sensor provided in the vehicle to vary the passenger's body part included in the passenger image according to the authentication code.

According to an embodiment, the control method of the transportation system may further include allowing the vehicle to output guide information for guiding the passenger's body part to be included in the passenger image in at least one of a visual, auditory and tactile manners.

According to an embodiment, the passenger's body part may be at least one of a fingerprint, an iris, a vein, a palm, and a face.

According to an embodiment, the control method of the transportation system may further include allowing the server to determine a scheme of generating the authentication code based on a sensor provided in the vehicle, wherein the mobile terminal generates the personal image according to the determined scheme.

According to an embodiment, the control method of the transportation system may further include disallowing the vehicle to grant the passenger permission to use the vehicle when passenger image does not match the authentication code.

According to an embodiment, the control method of the transportation system may further include allowing the vehicle to output notification information for notifying a new passenger image matching the authentication code to be generated in at least one of visual, auditory, and tactile manners when the passenger image does not match the authentication code.

According to an embodiment, the control method of the transportation system may further include allowing the mobile terminal to display a screen for confirming whether the user has boarded the vehicle on a display of the mobile terminal when the passenger image does not match the authentication code.

According to an embodiment, the screen may include the passenger image received through the server.

According to an embodiment, the control method of the transportation system may further include allowing the vehicle to display a predetermined password on the display of the vehicle when the passenger image does not match the authentication code, wherein the screen displayed on the display of the mobile terminal includes a keypad set to receive the predetermined password.

According to an embodiment, the control method of the transportation system may further include allowing the vehicle to grant the passenger permission to use the vehicle when the predetermined password matches a password received from the mobile terminal.

According to an embodiment, the control method of the transportation system may further include allowing the server to update the authentication code using the passenger image when passenger image matches the authentication code.

The control method of the transportation system may be executed by an application stored in a storage device such as a memory in the mobile terminal.

Meanwhile, the present disclosure provides a vehicle terminal included in the transportation system to generate various control commands related to the vehicle. Specifically, the present disclosure relates to a vehicle terminal that controls a vehicle mounted with a plurality of sensors capable of generating different passenger images, and the vehicle terminal may include a communication unit that performs communication with at least one of the plurality of sensors; and a processor that generates a passenger image comprising a passenger's personal information using any one of the sensors based on information received from the server through the communication unit, and grants the passenger permission to use the vehicle when the passenger image matches an authentication code stored in the server.

According to an embodiment, the processor may select one of the plurality of sensors for generating the passenger image to vary the passenger's body part included in the passenger image according to the information.

According to an embodiment, the processor may control the communication unit to output guide information for guiding the passenger's body part to be included in the passenger image in at least one of visual, auditory and tactile manners.

According to an embodiment, the body part of the passenger may be at least one of a fingerprint, an iris, a vein, a palm, and a face.

According to the transportation system, the passenger's mobile terminal may not be required to separately store the passenger's personal information, and thus memory space may be efficiently used. According to the transportation system of the present disclosure, a passenger using a transportation service may store his or her personal information on a server, and then perform authentication based on the personal information stored in the server whenever using the vehicle. Authentication may be automatically performed only by registering personal information once, and no additional input may be required, thereby increasing user convenience.

BRIEF DESCRIPTION OF THE DRAWINGS

FIG. 1 is a view illustrating an appearance of a vehicle according to an embodiment of the present disclosure.

FIG. 14 is a flowchart for explaining a control method of a transportation system when authentication fails.

DETAILED DESCRIPTION OF THE EMBODIMENTS

Figure 2:
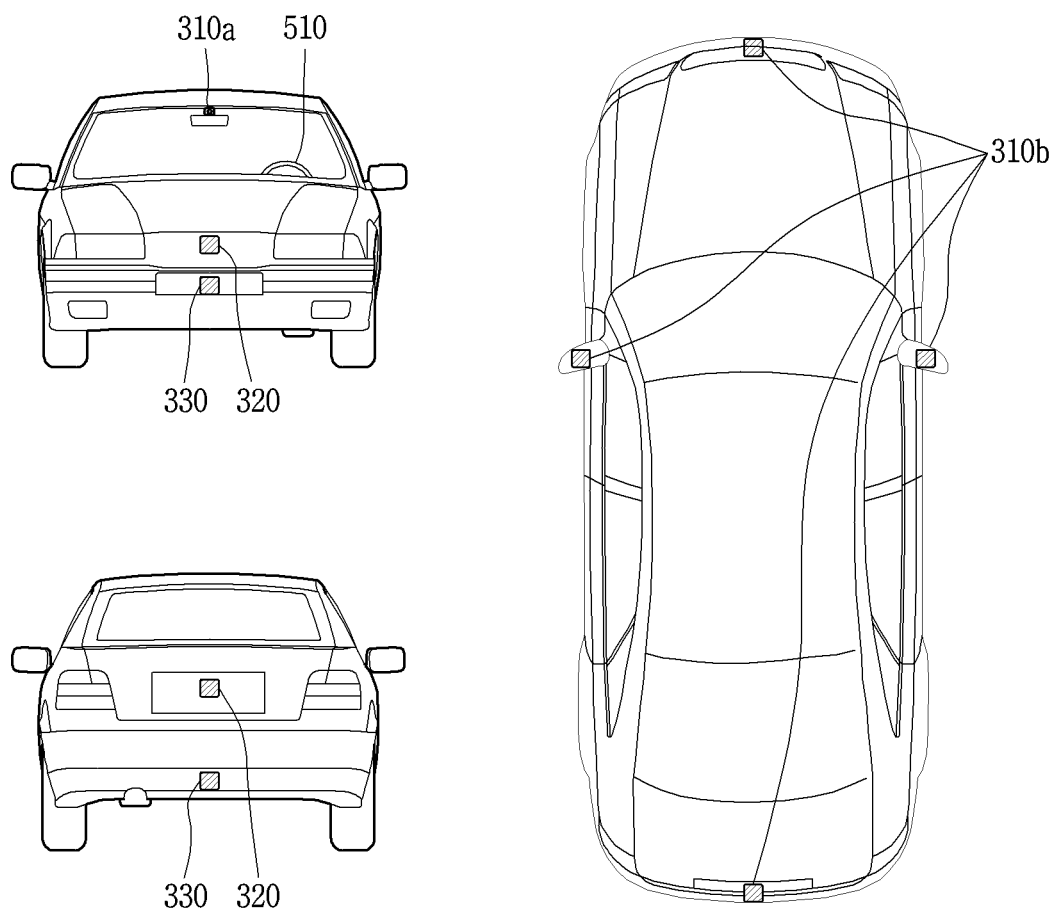
FIG. 2 is a view in which a vehicle according to an embodiment of the present disclosure is viewed at various angles from the outside.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is judged to obscure the gist of the present invention. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating an appearance of a vehicle according to an embodiment of the present disclosure.

FIG. 2 is a view in which a vehicle according to an embodiment of the present disclosure is viewed at various angles from the outside.

Figure 3:
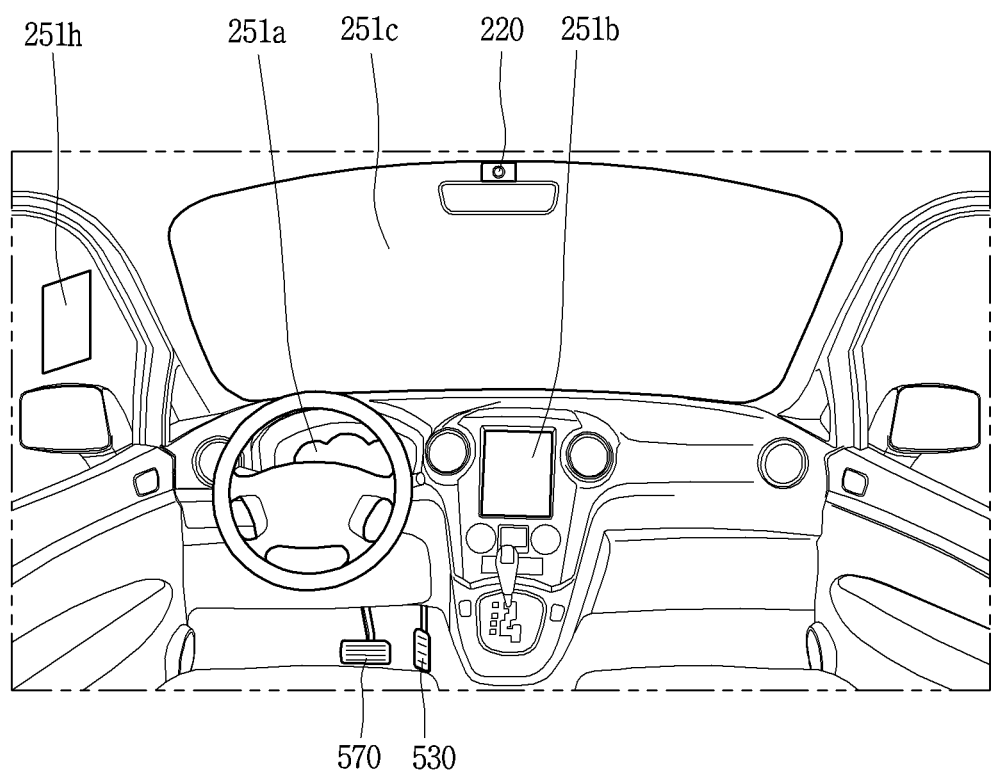
FIGS. 3 and 4 are views illustrating an inside of a vehicle according to an embodiment of the present disclosure.
Figure 4:
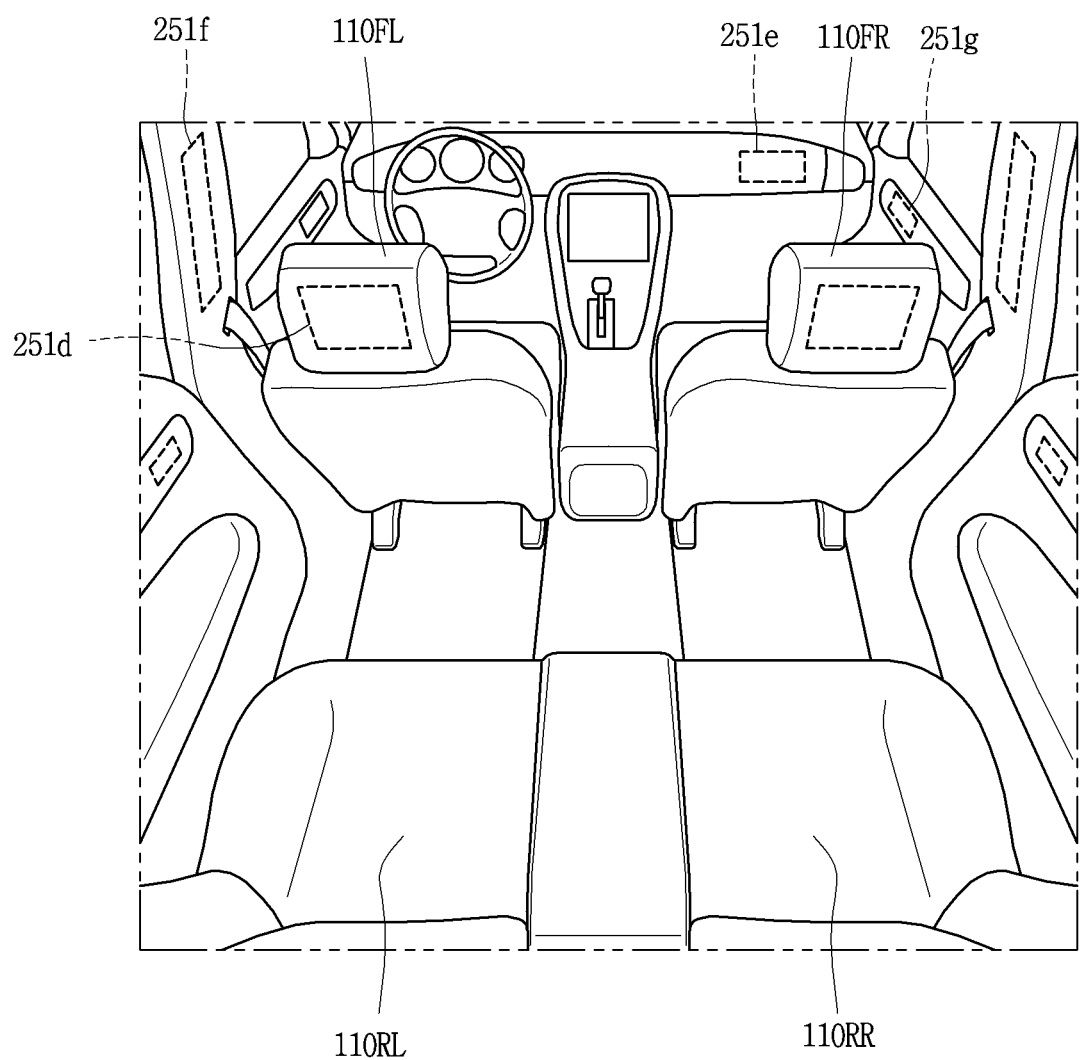

FIGS. 3 and 4 are views illustrating an inside of a vehicle according to an embodiment of the present disclosure.

Figure 5:
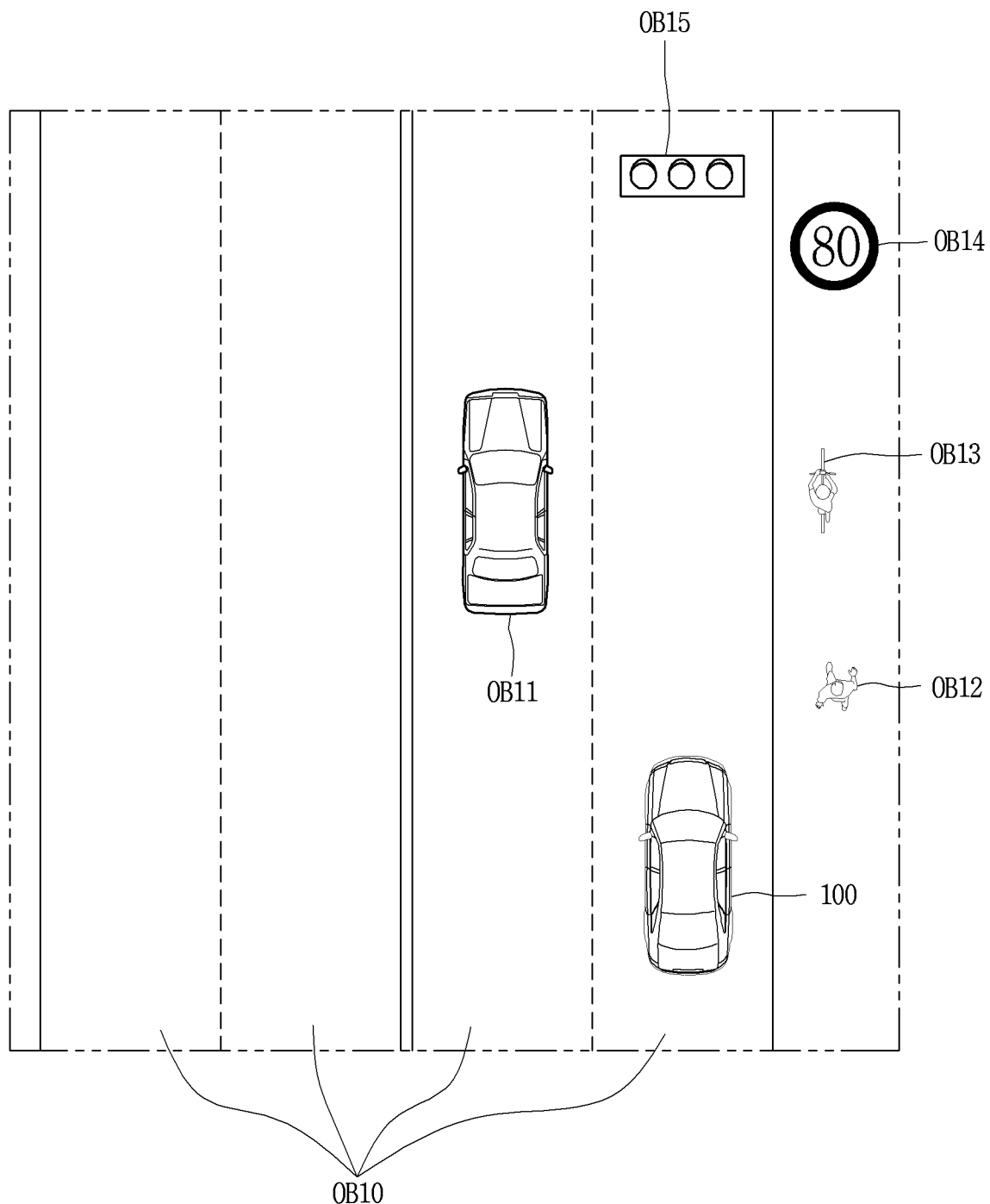
FIGS. 5 and 6 are views referenced to describe objects according to an embodiment of the present disclosure.
Figure 6:
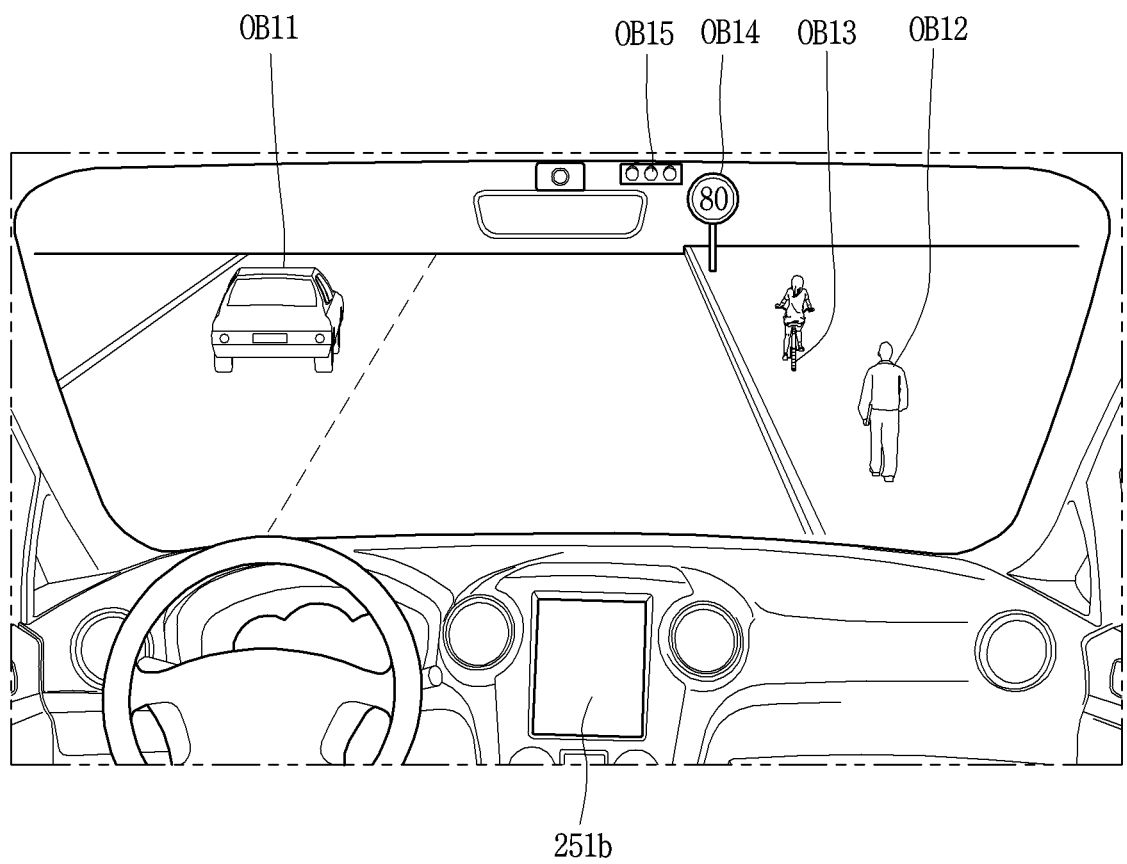

FIGS. 5 and 6 are views referenced to describe objects according to an embodiment of the present disclosure.

Figure 7:
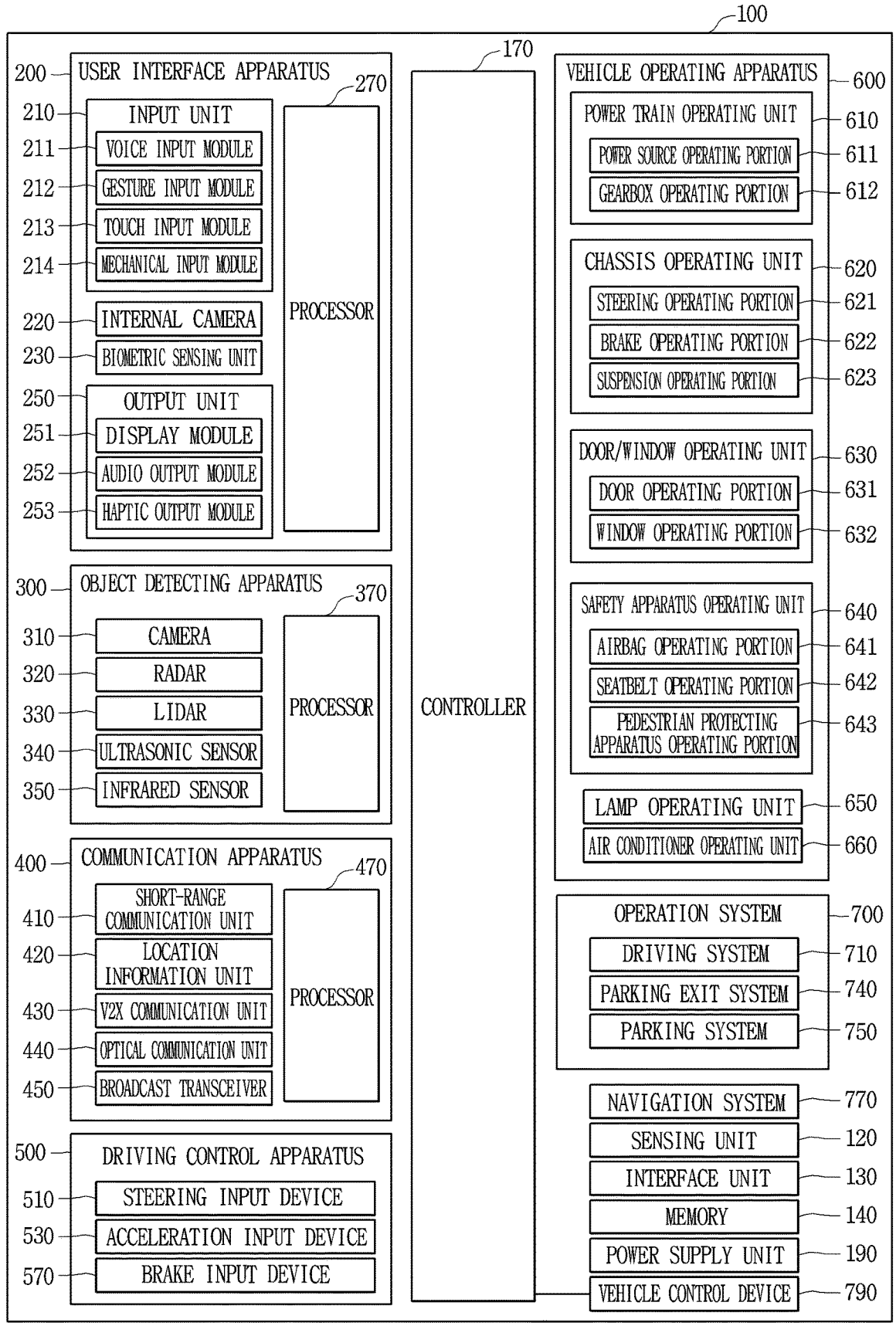
FIG. 7 is a block diagram referenced to describe a vehicle according to an embodiment of the present disclosure.

FIG. 7 is a block diagram referenced to describe a vehicle according to an embodiment of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

Here, autonomous driving is defined as controlling at least one of acceleration, deceleration, and driving direction based on a predetermined algorithm. In other words, it denotes that a driving operation device is automatically operated even if no user input is entered to the driving operation device.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, auditory or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a lidar 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle.

The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time of flight (TOF) manner or a phase-shift manner through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a "wireless communication unit".

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (vehicle to infrastructure; V2I), another vehicle (vehicle to vehicle; V2V), or a pedestrian (vehicle to pedestrian; V2P). The V2X communication unit 430 may include an RF circuit capable of implementing a communication protocol with an infrastructure (V2I), a communication protocol between vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in the form of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

Meanwhile, according to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Figure 8:
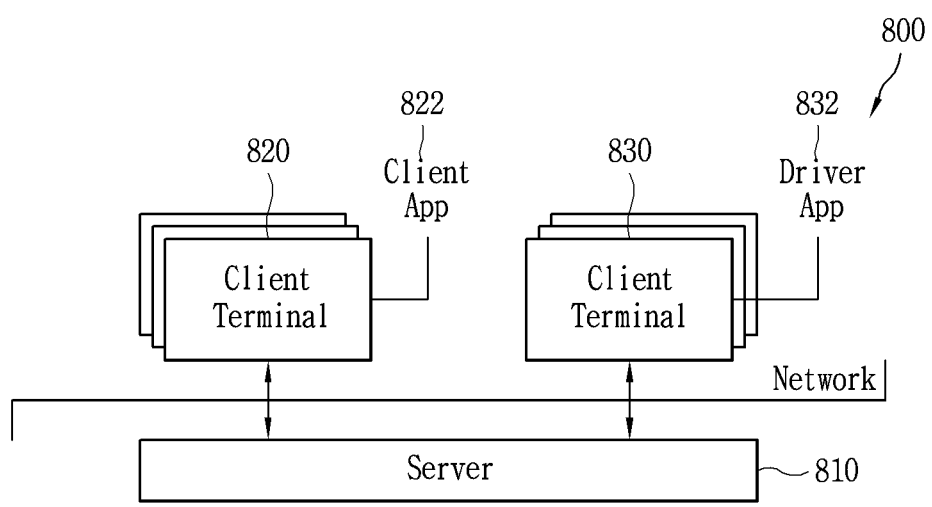
FIG. 8 is a conceptual view for explaining a transportation system of the present disclosure.

FIG. 8 is a conceptual view for explaining a transportation system of the present disclosure.

The transportation system 800 includes a server 810, a passenger terminal 820 provided with a passenger application 822, and a driver terminal 830 provided with a driver application 832.

Here, the passenger terminal 820 and the driver terminal 830 may refer to mobile terminals.

A mobile terminal described herein may include a mobile phone, a smart phone, a laptop computer, a digital broadcasting terminal, a personal digital assistant (PDA), a portable multimedia player (PMP), navigation, a slate PC, a tablet PC, an ultrabook, a wearable device (i.e., a watch-type terminal (smartwatch), glasses-type terminal (smart glasses), a head mounted display (HMD), and the like.

However, it would be easily understood by those skilled in the art that a configuration according to an embodiment described herein may be applicable to a stationary terminal such as a digital TV, a desktop computer, a digital signage, a central information display mounted on a vehicle, and the like, except when applicable only to a mobile terminal. Hereinafter, the term "terminal" denotes any one of the passenger terminal 820 and the driving terminal 830.

The control method of the transportation system described below may be performed through an application provided in the passenger terminal 820 and the driver terminal 830, respectively. Specifically, the operation of the passenger terminal 820 may be executed through the passenger application 822, and the operation of the driver terminal 830 may be executed through the driver application 832.

The transportation system 800 is to provide a transportation service to any passenger through any driver. Reservation, relay, connection, transport, and driver evaluation may be made through the transportation system 800.

Reservation of transportation service denotes that a passenger requests a vehicle to a departure point using the passenger terminal 820. This request is called a "vehicle request", and the vehicle request is transmitted to the server 810. The vehicle request may include a destination point to which the passenger intends to move, a type of vehicle the passenger intends to use, and a type of service.

The type of vehicle includes information about the vehicle itself and information about items included in the vehicle. The vehicle itself may be a two-seater, a four-seater, a convertible, etc., and the items included in the vehicle may be a refrigerator, a wheelchair, an umbrella, and the like. For example, upon receiving a vehicle request for a vehicle including a refrigerator in a two-seater, the server searches for a vehicle that satisfies the type of vehicle.

The type of service refers to a service provided through a vehicle. It may be a single service using a vehicle alone, a sharing service that shares the vehicle with any third party, or the like.

In the present disclosure, sharing is referred to as ride-sharing, but may also be referred to as vehicle-sharing, car-sharing, carpool, and the like.

Relay denotes that the server 810 allocates at least one vehicle to a passenger who has made a vehicle request in response to the vehicle request. Specifically, the server 810 searches for one or more driver terminals located in a predetermined range with respect to the location of the passenger terminal 820, and requests a reservation to the searched driver terminal. Such a request is called a "reservation request". Then, when any one of the driver terminals 830 approves the reservation request, a relay between the driver terminal 830 and the passenger terminal 820 is carried out. Through the relay, the passenger terminal and the driver terminal are connected to share various information for service provision. For example, the location of each terminal may be shared with each other.

Connection denotes an encounter between the relayed passenger and driver. Various functions for connection are executed in the passenger terminal 820 and the driver terminal 830 until ride is made after relay is made. For example, a path for moving to a departure point may be displayed on the driver terminal 830, and a remaining time for the vehicle to reach the departure point may be displayed on the passenger terminal 820.

Transportation denotes moving from a departure point to a destination point after ride is made. The passenger may change a path to the destination, or change the destination point itself, and may set a waypoint using his/her passenger terminal 820 while moving. In this case, the passenger terminal 820, the server 810, and the driver terminal 830 operate organically, thereby changing a path and providing a transportation service to the changed path.

Driver evaluation denotes that the passenger evaluates the driver during transportation or after getting off. For example, a user interface capable of evaluating the driver may be displayed on the passenger terminal 820 during or after getting off. When the passenger evaluates the driver through the passenger terminal 820, the server 810 may store the evaluation of the driver and classify the driver using the stored big data.

Each component of the transportation system 800 may be organically coupled to process location information generated by each terminal, and provide a transportation service using the location information. Each component 810-830 of the transportation system 800 transmits and receives data to and from each other through a network, and is organically linked to execute various functions related to a transportation service.

The logic of the transportation service may be implemented by various applications and/or hardware installed in each component. For example, the operation of the passenger terminal 820 described below may be executed through the passenger application 822, and the operation of the driver terminal 830 may be executed through the driver application 832.

The server 810 is configured to relay between the passenger terminal 820 and the driver terminal 830. The server 810 may include a passenger database, a driver database, and a map database.

When a vehicle request is received from the passenger terminal 820, the server 810 may select one or more driver terminals satisfying a predetermined condition based on the location of the passenger terminal 820, and transmit a reservation request to the selected driver terminal. At this time, a driver terminal located within a predetermined distance from the departure point or having a time required to move to the departure point within a predetermined time may be selected.

When any one of the driver terminals 830 that have received a reservation request approves the reservation request, the passenger terminal 820 and the driver terminal 830 respectively execute a preset function to make a connection between the passenger and the driver. In order to execute the preset function, the driver terminal 830 and the passenger terminal 820 may directly transmit and receive respective location information to and from each other or indirectly through the server 810.

The passenger terminal 820 may display the location of the vehicle and a time required for the vehicle to reach the departure point. On the contrary, the driver terminal 830 may path guide information that guides the vehicle to the departure point. The moving path of the vehicle may be calculated by the server 810 or the driver terminal 830.

When the passenger gets on the vehicle, the driver terminal 830 and/or the passenger terminal 820 may transmit a ride report to the server 810. Then, transportation is performed to the destination point, and the cost is calculated according to at least one of the transportation distance and the transportation time. The cost may be calculated differently depending on the type of vehicle and/or the type of service provided for transportation. The calculated cost is paid by a credit card or electronic money registered in advance.

Figure 9:
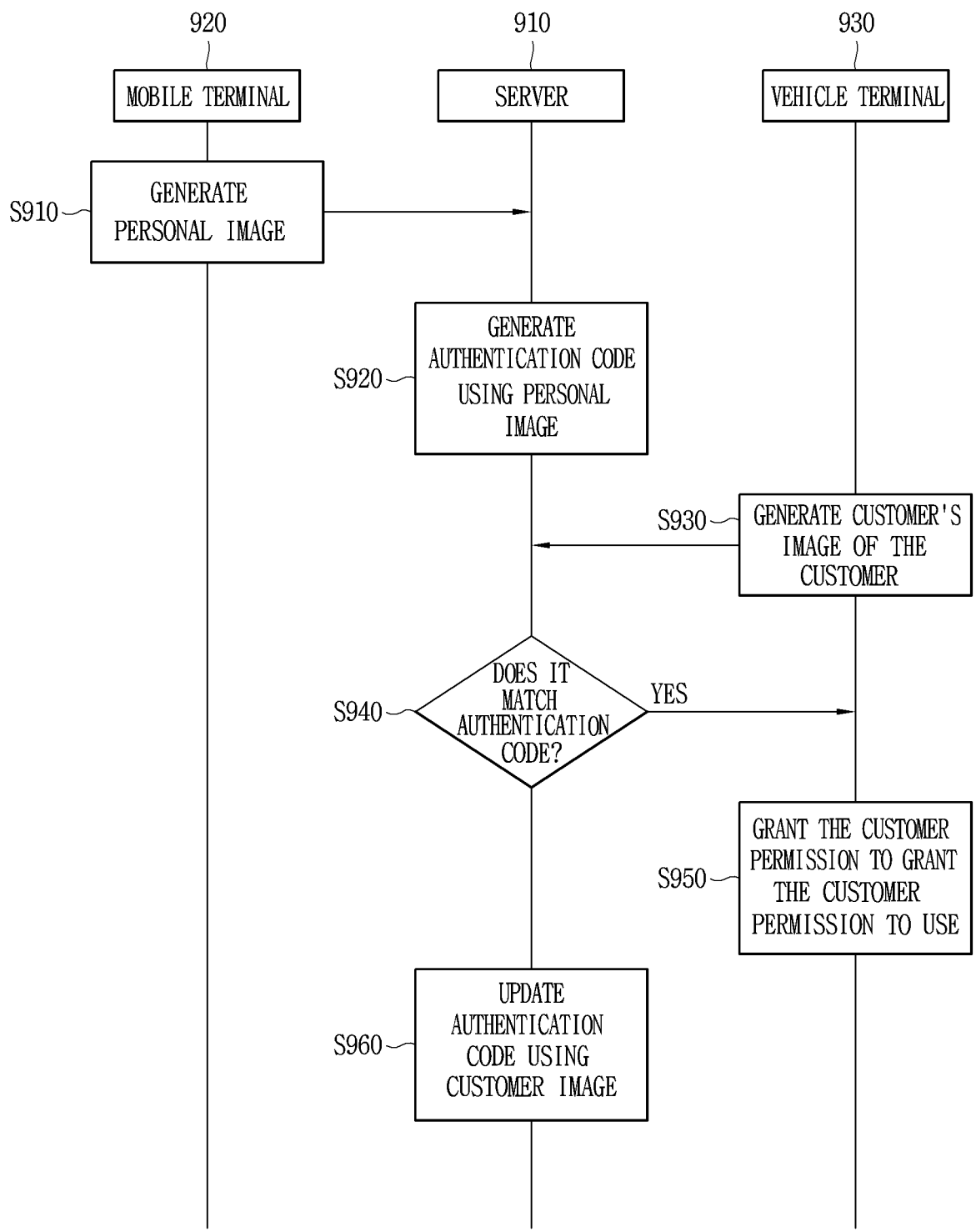
FIG. 9 is a flowchart for explaining a control method of the transportation system in FIG. 8.

FIG. 9 is a flowchart for explaining a control method of the transportation system in FIG. 8.

The transportation system may include a server 910, a mobile terminal 920, and a vehicle terminal 930.

The mobile terminal 920 is carried by a passenger who will use a transportation service, and may be the passenger terminal 820 in FIG. 8. The mobile terminal 920 may transmit a vehicle request for requesting a vehicle that satisfies a predetermined condition to the server 910.

The vehicle terminal 930 may be mounted on the vehicle 100 to provide a transportation service, and may be the driver terminal 830 in FIG. 8. The vehicle terminal 930 may perform authentication to determine whether he or she is a passenger who can use the vehicle 100, and perform different operations according to the authentication result.

The server 910 may connect between the mobile terminal 920 and the vehicle terminal 930, and transmit various messages (or information) related to authentication to at least one of the mobile terminal 920 and the vehicle terminal 930.

Here, the authentication refers to a procedure or process for checking whether a user of the mobile terminal 920 corresponds to a passenger who wants to use the vehicle 100. The authentication may be organically performed by at least one of the mobile terminal 920, the vehicle terminal 930, and the server 910.

In order to properly provide a transportation service, the user of the mobile terminal 920 on which a reservation has been made must get on the vehicle 100 on which the vehicle terminal 930 is mounted. When a third party unrelated to the reservation gets on the vehicle 100 or when the user of the mobile terminal 920 gets on any vehicle unrelated to the reservation, a loss occurs in the transportation system. In particular, when the vehicle 100 is an autonomous vehicle that controls at least one of acceleration, deceleration, and driving directions according to an algorithm without a driver, authentication corresponds to a very important procedure.

The transportation system according to the present disclosure provides a new type of control method of enhancing user convenience.

First, the mobile terminal 920 generates a personal image including the user's personal information (S910).

The personal information denotes information capable of directly and/or indirectly identifying an individual among information on natural persons that can be specified. The personal information may be generated as an image by a sensor, and may include at least one of fingerprint information, iris information, vein information, palmistry information, and face information.

The mobile terminal 920 may generate at least one personal information based on a sensor provided in the mobile terminal 920. For example, when the mobile terminal 920 is provided with a fingerprint recognition sensor, a personal image including a fingerprint may be generated using the fingerprint recognition sensor. For another example, when an iris recognition sensor is provided in the mobile terminal 920, a personal image including an iris may be generated using the iris recognition sensor.

When the mobile terminal 920 is provided with a plurality of sensors capable of generating different types of personal information, it may be selected which type of personal information is generated for the user based on the sensors owned by the mobile terminal 920. For example, when the fingerprint recognition sensor and the iris recognition sensor are provided in the mobile terminal 920, the mobile terminal 920 may generate one or more personal images including a fingerprint and/or an iris based on a user input.

The mobile terminal 920 may provide an interface for selecting a body part to be included in the personal image from the user, and select at least one sensor to generate the personal image according to a user input. Since the user can select a body part to generate his/her own authentication code according to his/her preference, user convenience related to authentication is enhanced.

The personal image generated by the mobile terminal 920 is transmitted to the server 910.

The server 910 uses the personal image received from the mobile terminal 920 to generate the user's authentication code. The authentication code is a biometric characteristic converted to a digital form, and may consist of unique or highly discriminated feature points extracted from the personal image.

The server 910 may perform an image normalization operation through scaling of the personal image, and extract feature points from the normalized image. The standardization operation denotes an operation of removing unnecessary noise from the personal image, and reducing, enlarging, and/or cropping the personal image to have a standard size.

The server 910 may extract feature points from a standardized personal image using a preset algorithm, and generate an authentication code corresponding to a user of the mobile terminal 920 using the extracted feature points.

Since the generation of the authentication code is not carried out in the personal terminal 920 but in the server 910, security for the authentication code may be further enhanced. The authentication code may be stored in the server 910 and managed as a database.

After the authentication code of the mobile terminal 920 is generated, at least one vehicle among a plurality of vehicles may be assigned to the mobile terminal 920 according to a vehicle request of the mobile terminal 920. In other words, relay may be carried out between the mobile terminal 920 and the vehicle terminal 930.

The vehicle 100 controlled by the vehicle terminal 930 moves to a departure point, and a user of the mobile terminal 920 may get on the vehicle 100 at the departure point.

The server 910 tracks the locations of the mobile terminal 920 and the vehicle terminal 830 in real time. In addition, when the vehicle terminal 830 is located within a predetermined range with respect to the mobile terminal 920, a passenger image generation command may be transmitted to the vehicle terminal 930.

The predetermined range denotes a distance sufficient to allow the vehicle terminal 930 to photograph a passenger image for the user of the mobile terminal 920. The predetermined range may be defined within x meters with respect to a point of the vehicle 100, wherein x may be a positive real number. For example, the range may be set to 1 meter that can be seen as the mobile terminal 920 is located inside the vehicle 100 or may be set to 3 meters in which the user of the mobile terminal 920 can contact an outside of the vehicle 100.

The passenger image generation command may be transmitted from the server 910 to the vehicle terminal 930 according to a preset condition, regardless of the location of the mobile terminal 920. Alternatively, the vehicle terminal 930 may automatically generate the passenger image generation command according to the preset condition.

For example, the passenger image may be generated by the vehicle terminal 930 in various situations such as a case where a passenger on the vehicle 100 presses an emergency brake button provided on the vehicle 100, a case where the passenger changes the destination of the vehicle 100, a case where the passenger uses an article provided in the vehicle 100, a case where the passenger unlocks an article installed in the vehicle 100, a case where any third party opens a door of the vehicle 100, and the like.

In response to the passenger image generation command, the vehicle terminal 930 generates a passenger image of the passenger (S930). The generation of the passenger image is a procedure for checking whether the passenger matches the user of the mobile terminal 920, and the passenger may correspond to a subject of the passenger image, and may correspond to any third party.

The passenger image may be generated in a variety of ways. Specifically, the vehicle 100 may include a plurality of sensors capable of generating different passenger images, and the vehicle terminal 930 may generate at least one passenger image using at least one of the sensors.

A method of generating the passenger image will be described later with reference to FIG. 11.

Referring back to FIG. 9, the passenger image generated by the vehicle terminal 930 is transmitted to the server 910.

The server 910 determines whether the passenger image matches the user of the mobile terminal 920 who has made a reservation to use the vehicle terminal 930 using the authentication code of the mobile terminal 920. In other words, the server 910 determines whether the passenger image matches the authentication code (S940).

The process of determining whether to match includes part of the process of making the authentication code. Specifically, the server 910 may perform an image normalization operation through the scaling of the passenger image, and extract feature points from the normalized image.

The server 910 determines whether the feature points extracted from the passenger image match the authentication code of the personal image registered in the server 910. A matching rate may be quantified, and whether the passenger is the user of the mobile terminal 920 is determined according to the matching rate.

The server 910 transmits an authentication success message to the vehicle terminal 930 when the matching rate is higher than the reference, and transmits an authentication failure message to the vehicle terminal 930 when the matching rate is lower than or equal to the reference.

In response to the authentication success message, the vehicle terminal 930 may grant the passenger permission to user the vehicle 100 (S950). A customized service may be provided to the passenger, and various functions specialized for the passenger may be unlocked.

For example, the vehicle terminal 930 may unlock a door provided in the vehicle 100 to allow the passenger to get on the vehicle 910. The vehicle terminal 930 may allow the passenger to set the destination of the vehicle 100, and allow the vehicle 100 to autonomously drive to a place requested by the passenger.

On the contrary, when the authentication failure message is transmitted, the vehicle terminal 930 does not grant the passenger permission to use the vehicle. For example, the vehicle 100 may lock the door provided in the vehicle 100 or limit the operation of a start button not to allow the vehicle 100 to start. When the vehicle 100 was autonomously driving, the vehicle 100 may stop autonomous driving and stop at a parking position.

Meanwhile, when the passenger image matches the authentication code, the server 910 may update the authentication code using the passenger image (S960).

Due to the nature of bioinformation, learning is possible, and the more data, the higher the accuracy. When feature points extracted from the passenger image match the authentication code, the feature points extracted from the passenger image correspond to valid data and the latest data. Therefore, the server 910 may update the authentication code by learning feature points extracted from the passenger image.

According to the transportation system of the present disclosure, a passenger using the transportation service may store his or her own personal information on a server, and perform authentication based on the personal information stored on the server each time a vehicle is used. Authentication may be automatically performed only by registering personal information once, and no additional input may be required, thereby increasing user convenience.

Figure 10:
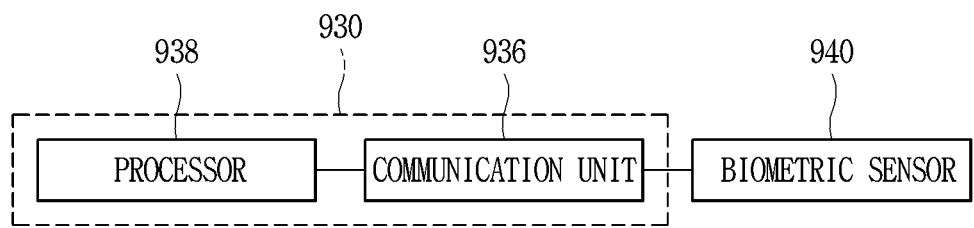
FIG. 10 is a block diagram for explaining a vehicle terminal in FIG. 9 in more detail.

FIG. 10 is a block diagram for explaining the vehicle terminal of FIG. 9 in more detail.

The vehicle terminal 930 is provided in the vehicle 100, and may be an independent device that can be attached to or detached from the vehicle 100, or may be a part the components of the vehicle 100 integrally installed into the vehicle 100.

Hereinafter, for the sake of convenience of explanation, the vehicle control device 790 will be described as a separate component that is independently formed from the controller 170 of the vehicle 100. However, this is only an embodiment of the present disclosure, and all the operation and control method of the vehicle control device 790 described herein may be carried out by the controller 170 of the vehicle 100. In other words, the operation and/or control method performed by the processor 880 of the vehicle control device 790 may also be performed by the controller 170 of the vehicle 100.

Referring to FIG. 8, the vehicle terminal 930 includes a communication unit 936 and a processor 938.

The communication unit 936 is configured to perform communication with various components described in FIG. 7 in a wired and/or wireless manner. For an example, the communication unit 936 may receive various information provided through a controller area network (CAN).

The communication unit 936 may communicate with a terminal located within a predetermined distance from the vehicle. For example, the processor 938 may search for a mobile terminal 920 located inside or outside the vehicle 100, and perform communication with the searched mobile terminal using the communication unit 936. In other words, the communication unit 936 is configured to perform communication with one or more terminals located inside the vehicle 100.

The communication unit 936 is a device capable of communicating with a terminal located inside or outside the vehicle 100, and there is no limitation on a method of performing communication. For example, the communication unit 936 may be connected in a wired manner to perform communication or perform communication in a wireless manner using various communication technologies such as Bluetooth, Wi-Fi, and the like.

The communication unit 936 may receive information related to the driving of the vehicle from most of the devices provided in the vehicle 100. The information transmitted from the vehicle 100 to the vehicle terminal 930 is referred to as "vehicle driving information."

The vehicle driving information includes vehicle information and surrounding information of the vehicle. The information related to the inside of the vehicle with respect to the frame of the vehicle 100 may be defined as vehicle information, and the information related with the outside of the vehicle may be defined as surrounding information.

Vehicle information denotes information on the vehicle itself. For example, the vehicle information may include at least one of a driving speed of the vehicle, a driving direction, an acceleration, an angular speed, a position (GPS), a weight, a number of vehicle occupants, a braking force of the vehicle, a maximum braking force of the vehicle, an air pressure of each wheel, a centrifugal force applied to the vehicle, a driving mode of the vehicle (whether it is an autonomous driving mode or a manual driving mode), a parking mode of the vehicle (autonomous parking mode, automatic parking mode, manual parking mode), whether or not a user is on board the vehicle, information related to the user, and the like.

The surrounding information denotes information relate to another object located within a predetermined range around the vehicle and information related to the outside of the vehicle. The surrounding information of the vehicle may be a state of road surface (frictional force) on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

In addition, the surrounding information may include an ambient brightness, a temperature, a sun position, surrounding object information (a person, a vehicle, a sign, etc.), a type of road surface during driving, a geographic feature, line information, driving lane Information, and information required for autonomous driving/autonomous parking/automatic parking/manual parking mode.

Furthermore, the surrounding information may further include a distance from an object existing around the vehicle to the vehicle 100, a possibility of collision, a type of the object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 100.

Meanwhile, the processor 938 is configured to control one or more displays provided in the vehicle 100 using the communication unit 936.

Specifically, the processor 938 may determine whether at least one of a plurality of preset conditions is satisfied based on vehicle driving information received through the communication unit 936. Depending on the satisfied conditions, the processor 938 may control the one or more displays in different ways.

In connection with the preset condition, the processor 938 may sense the occurrence of an event in an electronic unit and/or application provided in the vehicle 100 and determine whether the sensed event satisfies the preset condition. At this time, the processor 938 may detect the occurrence of an event from information received through the server 810.

The application is a concept including a widget, a home launcher, and the like, and refers to all types of programs that can be driven on the vehicle 100. Accordingly, the application may be a program that performs a function of web browser, video playback, message transmission/reception, schedule management, and application update.

In addition, the application may include forward collision warning (FCW), blind spot detection (BSD), lane departure warning (LDW), pedestrian detection (PD), curve speed warning (CSW), and turn-by-turn navigation (TBT).

For example, an event may occur when there is a missed call, when there is an application to be updated, when a message arrives, start on, start off, autonomous driving on/off, LCD awake key, alarm, incoming call, missed notification, or the like.

For another example, an event may occur when a warning set by an advanced driver assistance system (ADAS) occurs or a function set by the ADAS is performed. For example, when a forward collision warning occurs, when a blind spot detection occurs, when a lane departure warning occurs, when a lane keeping assist warning occurs, when autonomous emergency braking function is performed, or the like may be seen as an occurrence of an event.

For another example, when changed from a forward gear to a reverse gear, when an acceleration greater than a predetermined value is generated, when a deceleration greater than a predetermined value is generated, when a power device is changed from an internal combustion engine to a motor, when changed from the motor to the internal combustion engine, or the like may also be seen as an occurrence of an event.

In addition, when various ECUs provided in the vehicle 100 perform a specific function may also be seen as an occurrence of an event.

When the occurred event satisfies a preset condition, the processor 938 controls the communication unit 936 to display information corresponding to the satisfied condition on the one or more displays.

The processor 938 may generate an autonomous driving command to autonomously drive the vehicle 100 based on the vehicle driving information. For example, an autonomous driving command may be generated to change the driving direction, or change the speed, or operate the brake according to an algorithm even when the driver does not perform separate driving.

The vehicle terminal 960 may include a biometric sensor 940 configured to generate a passenger image including the passenger's personal information. Alternatively, the vehicle terminal 960 may control the biometric sensor 940 provided in the vehicle 100 through the communication unit 936.

The biometric sensor 940 may be configured with one or a plurality of sensors. Each sensor is configured to generate a unique passenger image for a passenger's body part, and the body part may correspond to at least one of a fingerprint, an iris, a vein, a palm, and a face. For example, the biometric sensor 940 may include at least one of a fingerprint recognition sensor, an iris recognition sensor, a vein recognition sensor, a palm recognition sensor, and a face recognition sensor.

The processor 938 generates a passenger image including the passenger's personal information using any one of the sensors based on information received from the server 910 through the communication unit 936. Moreover, when the passenger image matches an authentication code stored in the server, the processor 938 may grant the passenger permission to use the vehicle.

The processor 938 may select any one of the plurality of sensors to generate the passenger image such that the passengers' body part included in the passenger image is varied according to information received from the server 910. For example, when the authentication code registered in the server 910 is generated as a fingerprint, the processor 938 may generate a passenger image including the passenger's fingerprint using the fingerprint recognition sensor. Alternatively, when the authentication code registered in the server 910 is generated as an iris, the processor 938 may generate a passenger image including the passenger's iris using the iris recognition sensor.

The processor 938 may control the communication unit 936 to output guide information for guiding the passenger's body part to be included in the passenger image in at least one of visual, auditory and tactile manners. For example, when the processor 938 selects the fingerprint recognition sensor, guide information for guiding the passenger to place a fingerprint on the fingerprint recognition sensor is output through the output unit 250 as described above in FIG. 7.

Figure 11:
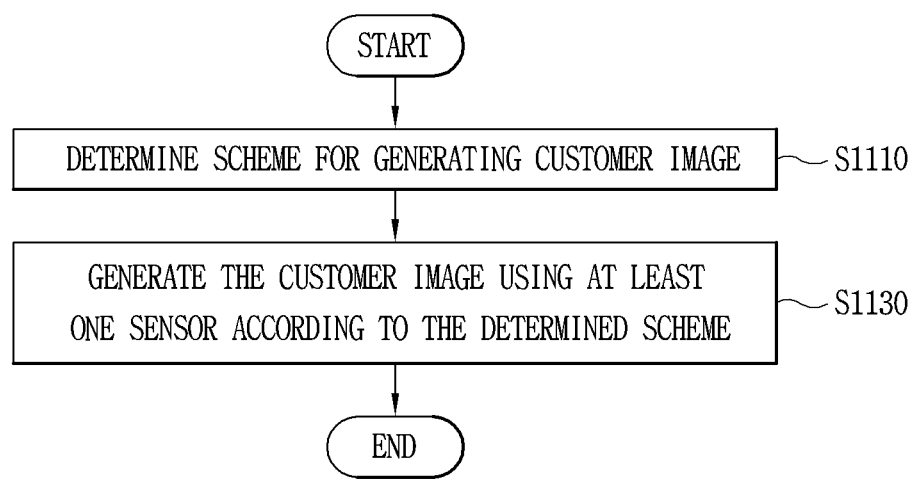
FIG. 11 is a flowchart for explaining a control method by the vehicle terminal in FIG. 10.

FIG. 11 is a flowchart for explaining a control method by the vehicle terminal in FIG. 10, and FIGS. 12A, 12B, 13A and 13B are exemplary views for explaining embodiments according to the control method of FIG. 11.

The processor 938 determines a method of generating the passenger image in response to the passenger image generation command (S1110). Specifically, the processor 938 determines a method of generating the passenger image based on a sensor provided in the vehicle 100.

Next, the processor 938 generates the passenger image using any one of the plurality of sensors based on the determined method (S1130). The any one sensor varies according to the determined method.

In order to generate a passenger image that can be compared with an authentication code registered in the server 910, the processor 938 may determine which method, that is, which sensor, is used to generate the passenger image. In other words, the processor 938 may select a sensor for generating the passenger image.

The processor 938 controls a sensor provided in the vehicle such that the passenger's body part included in the passenger image varies according to the authentication code.

The vehicle 100 may be provided with a plurality of sensors capable of generating different passenger images. Even in the case of the same type of sensors, one may be disposed outside the vehicle 100, and the other one may be disposed inside the vehicle 100.

For example, an external fingerprint recognition sensor may be disposed on a door of the vehicle 100 to unlock the door from an outside of the vehicle 100. A driver fingerprint recognition sensor for recognizing a driver's fingerprint and a rear seat fingerprint recognition sensor for recognizing a fingerprint of a passenger who gets on the rear seat may be disposed inside the vehicle 100. In this case, even after it is determined to generate a passenger image using a fingerprint, the processor 938 may select any one of fingerprint recognition sensors based on the location of the passenger. For example, when a passenger gets on the rear seat of the vehicle 100, the passenger image may be generated using the rear seat fingerprint recognition sensor.

Meanwhile, a plurality of authentication codes generated by different body parts may be registered in the server 910. In this case, the processor 938 may generate a passenger image for comparison with any one of the authentication codes based on the characteristics of the passenger.

Specifically, the processor 938 generates a face image including the passenger's face. The processor 938 extracts basic information on the passenger using the face image. For example, basic information such as gender, whether a hat is worn, whether a muffler is worn, whether glasses are worn, hairstyle, and the like.

The processor 938 may select any one of a plurality of sensors provided in the vehicle 100 based on the face image, and generate the passenger image using the selected sensor.

Figure 12A:
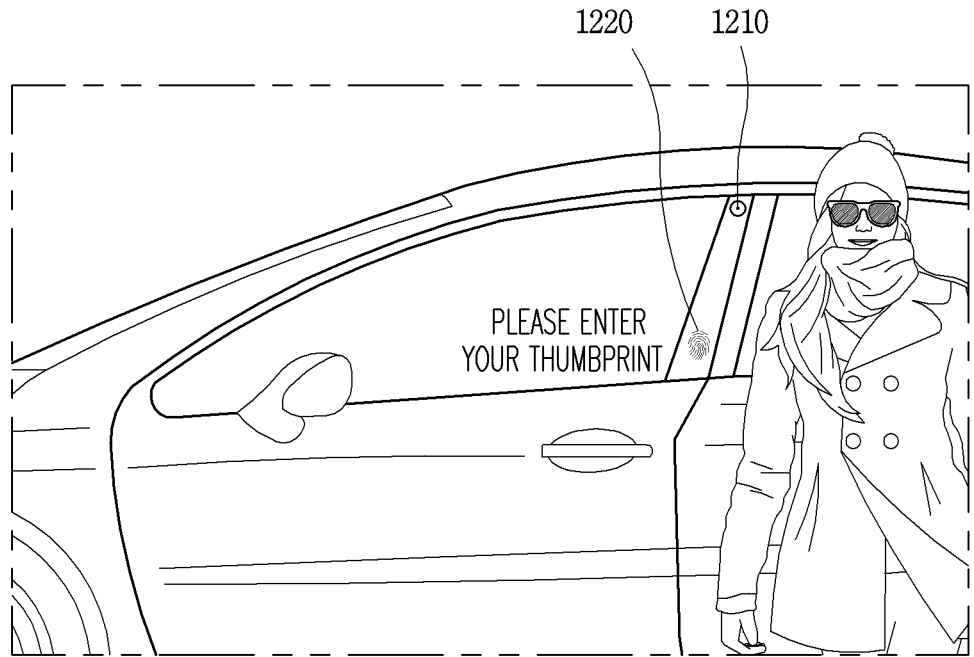
FIGS. 12A, 12B, 13A and 13B are exemplary views for explaining embodiments according to the control method of FIG. 11.
Figure 12B:
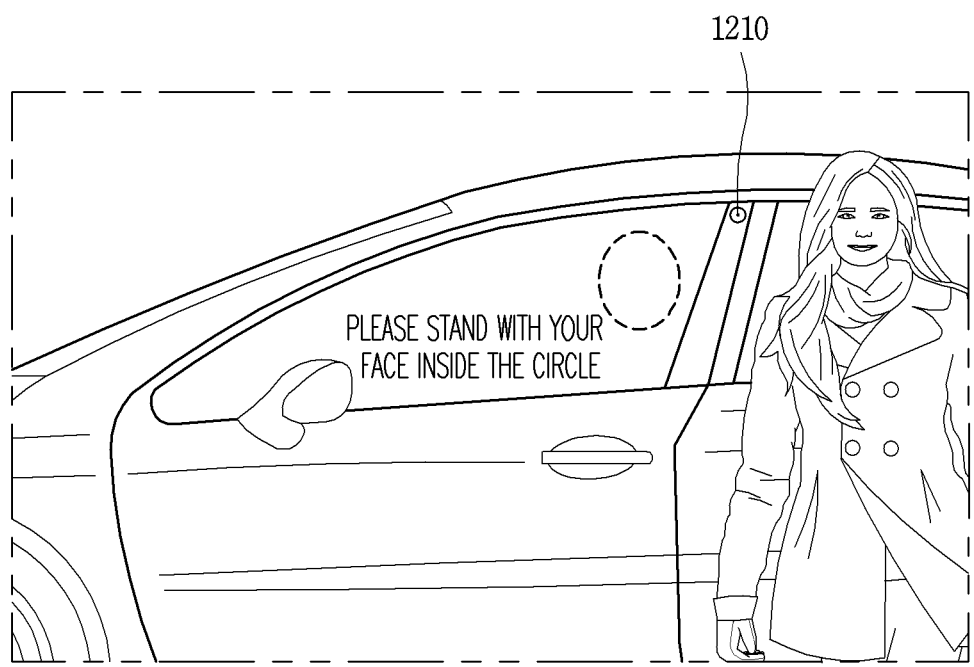

For example, as illustrated in FIGS. 12A and 12B, a door of the vehicle 100 may be disposed with an external fingerprint recognition sensor 1220 configured to generate a passenger image including the passenger's fingerprint through an external camera 1210 configured to photograph the passenger's face image. Visual information may be displayed in various ways on a windshield provided in the door.

As illustrated in FIG. 12A, when the passenger is wearing sunglasses and the iris recognition and the face recognition are inappropriate, the external fingerprint recognition sensor 1220 for fingerprint recognition may be selected. Guide information for guiding a fingerprint to be input to the external fingerprint recognition sensor 1220 may be displayed on the windshield of the door.

Alternatively, as illustrated in FIG. 12B, when fingerprint recognition is inappropriate because the passenger is wearing gloves, a sensor (external camera, 1210) for face recognition may be selected. Guidance information for performing face recognition may be displayed on the windshield of the door.

Various sensors configured to generate a passenger image including the passenger's body part may also be provided in the vehicle 100. For example, as illustrated in FIGS. 13A and 13B, an internal camera 1310 configured to recognize at least one of the passenger's iris and face, and an internal fingerprint recognition sensor 1350 configured to recognize the passenger's fingerprint may be disposed inside the vehicle 100.

The vehicle terminal 930 may generate a face image including the passenger's face using the internal camera 1310, and select any one of sensors disposed inside the vehicle 100 based on the face image.

Figure 13A:
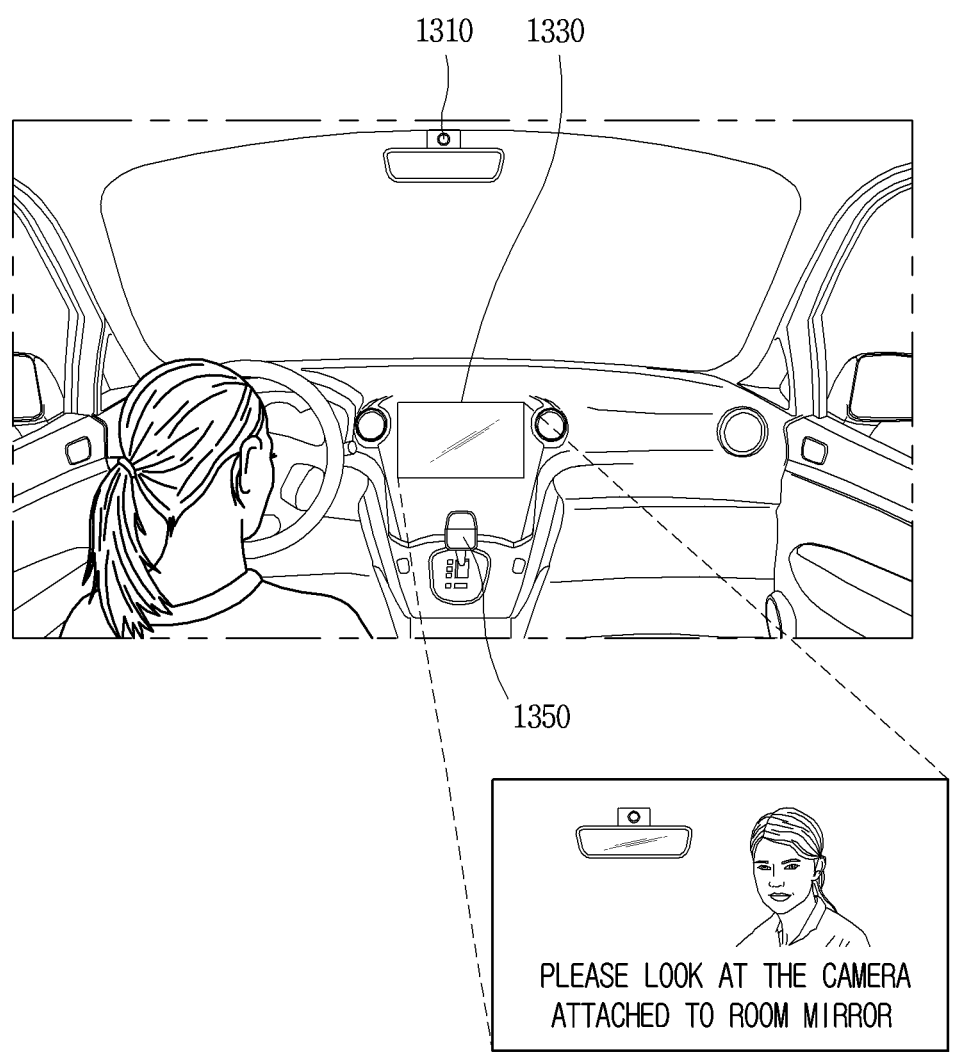

For example, as illustrated in FIG. 13A, when face recognition is possible, the internal camera 1310 is selected to generate a passenger image including the passenger's face.

Figure 13B:
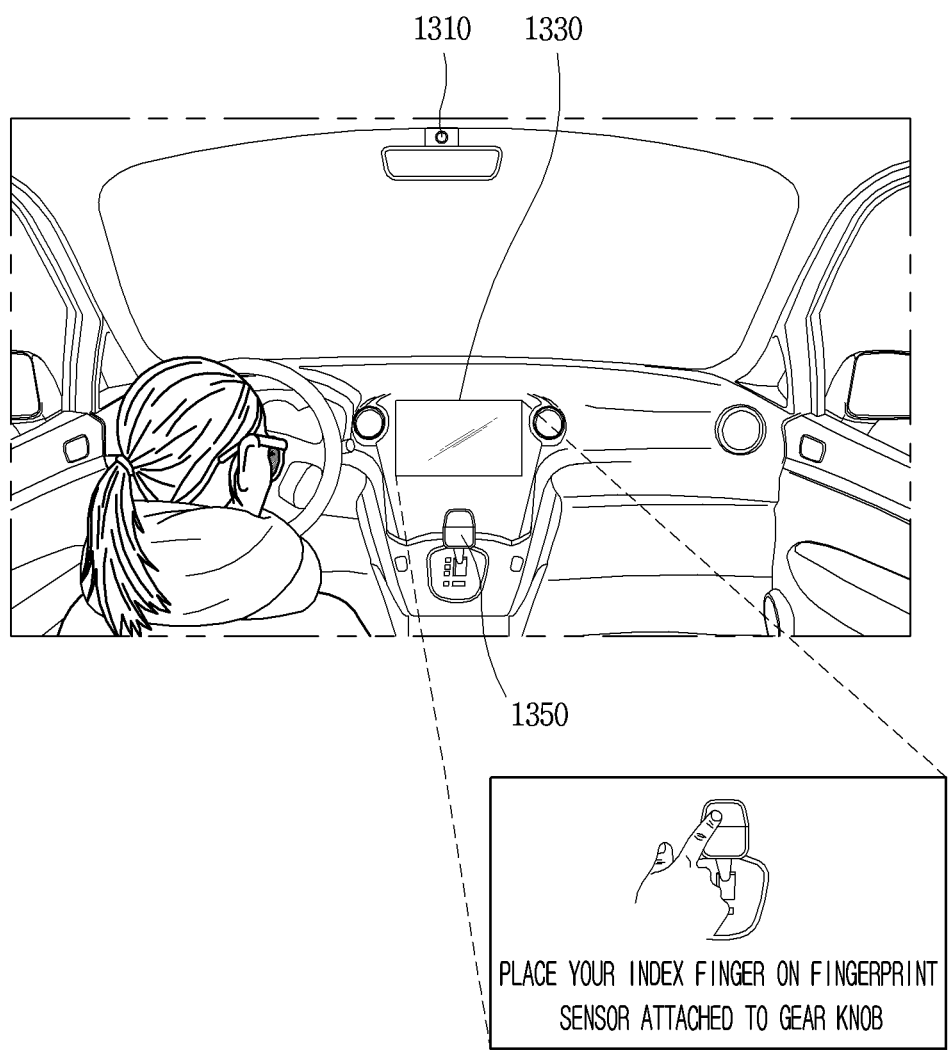

On the contrary, as illustrated in FIG. 13B, when face recognition is not possible, the internal fingerprint recognition sensor 1350 is selected to generate a passenger image including the passenger's fingerprint.

In general, a person has 10 fingerprints, and 10 different authentication codes may be generated according to a finger for entering a fingerprint. The server 910 may transmit which finger should be used to enter the fingerprint to the vehicle terminal 930 based on the authentication code registered in the server 910. The vehicle terminal 930 may output guide information for guiding a finger to be input to the internal fingerprint recognition sensor 1350 based on information received from the server 910. In other words, the guide information may have different types of text or images depending on the finger to be input. For example, as illustrated in FIG. 13B, when it is required to input an index finger, an image corresponding to the index finger may be displayed on a display provided in the vehicle 100.

Figure 15:
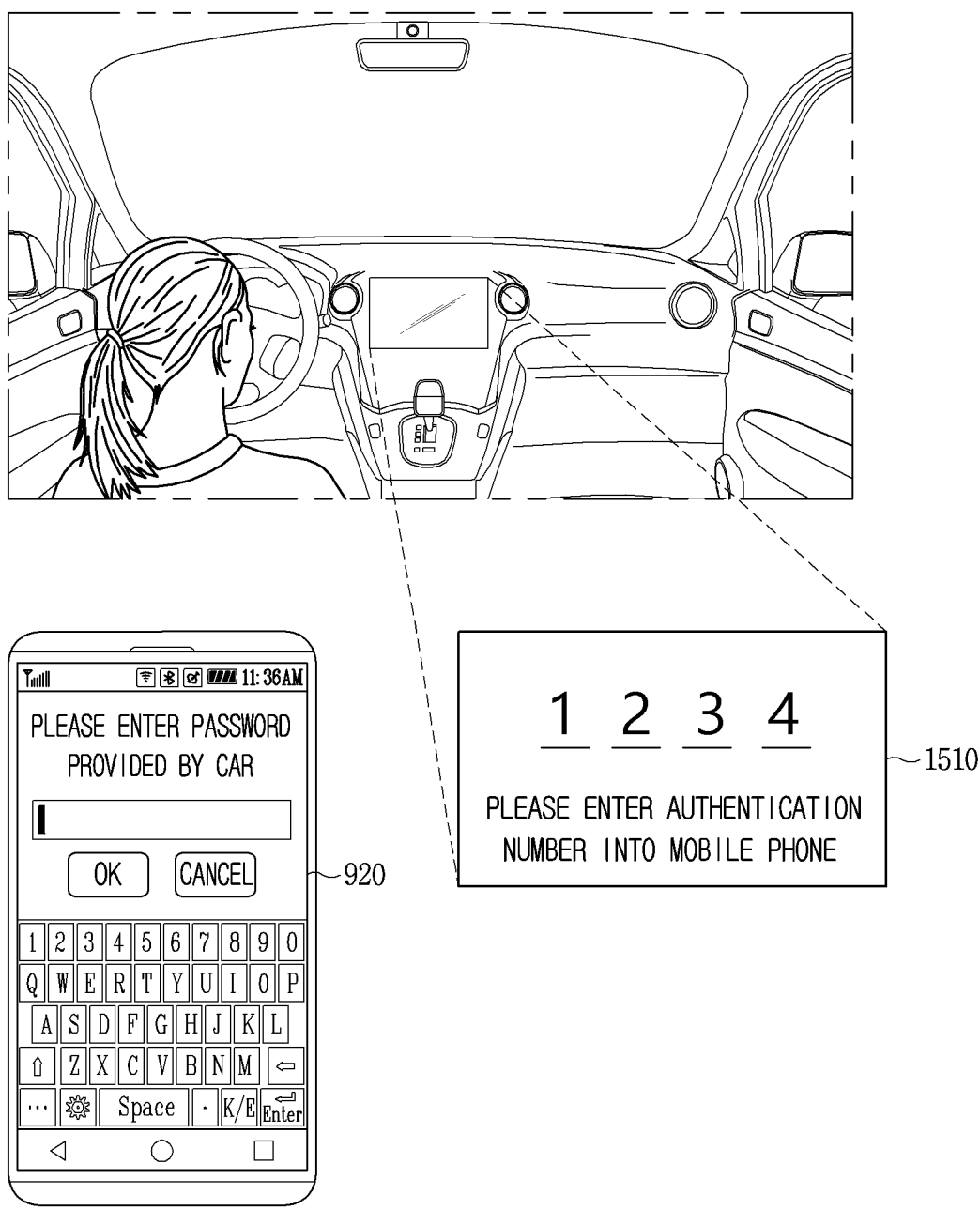
FIG. 15 is an exemplary view for explaining the control method of FIG. 14.

FIG. 14 is a flowchart for explaining a control method of a transportation system when authentication fails, and FIG. 15 is an exemplary view for explaining the control method of FIG. 14.

The image received from the vehicle terminal 930 may not match the authentication code registered in the server 910. In this case, the server 910 transmits an authentication failure message indicating that authentication has failed to the vehicle terminal 930 and/or the mobile terminal 920 (S1410).

The vehicle terminal 930 may output notification information in at least one of visual, auditory and tactile manners to generate a new passenger image matching the authentication code in response to the authentication failure message (S1420).

The mobile terminal 920 may display a screen for confirming whether the user has boarded the vehicle in response to the authentication failure message on the display of the mobile terminal (S1430).

The screen may include the passenger image received through the server 910. Through this, the user of the mobile terminal may check whether his or her personal information is being stolen by a third party, and visually check whether there is any problem in the authentication process.

The reason for performing authentication in the present disclosure is to correctly connect the reserved passenger to the vehicle. This is to prevent any third party from getting on the vehicle or the passenger from getting on other vehicles.

Due to sensor aging or performance problems, there is a possibility that authentication using a passenger image may fail. In this case, even when a new passenger image is taken, it is highly likely that authentication will fail again.

To prevent this, the transportation system according to the present disclosure provides a new authentication procedure.

As illustrated in FIG. 15, the vehicle terminal 930 may display a predetermined password on the display 1510 of the vehicle 100. In addition, the notification information displayed on the mobile terminal 920 may include a keypad set to receive a password.

When a user input is entered, the mobile terminal 920 transmits a terminal message to the server 910 (S1440). The server 910 determines whether to grant use authority based on the terminal message, and transmits a message corresponding thereto to the vehicle terminal 930 (S1450).

The mobile terminal 920 transmits a password that has been input from the user to the server 910, and the server 910 determines whether the password received from the mobile terminal 920 and the predetermined password received from the vehicle terminal 930 match each other.

When the predetermined password and the password match each other, the vehicle terminal 930 grants the passenger permission to use the vehicle.

On the contrary, when the predetermined password and the password do not match, or when the password is not entered to the mobile terminal 920 within a predetermined period of time, guide information for guiding the third party to get off the vehicle may be output since the third party has boarded the vehicle 100.

On the other hand, when a relay between the mobile terminal 920 and the vehicle terminal 930 is completed, the server 910 may request the mobile terminal 920 to generate an authentication code. In this case, the server 910 may determine a method of generating the authentication code based on sensors provided in the vehicle 100, and the mobile terminal 920 may generate a user's personal image according to the determined method. For example, when only the fingerprint recognition sensor is provided in the vehicle 100, the mobile terminal 920 may photograph a user's personal image using his or her fingerprint, and the server 910 may generate an authentication code using a personal image included in the fingerprint. Since an authentication code is generated according to the characteristics of the vehicle 100 on which boarding is scheduled, a situation that creates an unnecessary authentication code is prevented in advance.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 980 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A method of controlling a transportation system that includes a mobile terminal, a vehicle, and a server, the method comprising:
    generating, by the mobile terminal, a user's image that includes the user's personal information;
    generating, by the server, a user's authentication code using the user's personal information generated by the mobile terminal;
    generating, by the vehicle, a passenger's image that includes the passenger's personal information;
    granting, by the vehicle, the passenger permission to use the vehicle based on the passenger's image matching the user's authentication code;
    disallowing, by the vehicle, the passenger from using the vehicle based on the passenger's image not matching the user's authentication code; and
    displaying, on a screen of the mobile terminal, a confirmation that the user has boarded the vehicle based on the passenger's image not matching the user's authentication code.

2. The method of claim 1, wherein the vehicle comprises a plurality of sensors that are configured to generate the passenger's image by using at least one of the plurality of the sensors.

3. The method of claim 2, further comprising:
determining, by the server or the vehicle, a scheme of generating the passenger's image based on a sensor provided in the vehicle,
wherein the vehicle is configured to generate the passenger's image based on the determined scheme.

4. The method of claim 3, wherein generating the passenger's image further comprises generating, based on the determined scheme, the passenger's image by selecting and using one of the plurality of the sensors,
wherein the selected one of the plurality of the sensors varies according to the determined scheme.

5. The method of claim 2, wherein generating the passenger's image comprises:
generating a face image that includes the passenger's face;
selecting, based on the generated face image, one of the plurality of the sensors; and
generating the passenger's image by using the selected one of the plurality of the sensors.

6. The method of claim 1, wherein the vehicle includes a sensor that is configured to vary the passenger's body part that is included in the passenger's image.

7. The method of claim 6, further comprising:
outputting, by the vehicle, guiding information to the passenger to move the passenger's body part to be included in the passenger's image, wherein the guiding information is output to the passenger in at least one of a visual, an auditory, or a tactile manner.

8. The method of claim 7, wherein the passenger's body part comprises at least one of a fingerprint, an iris, a vein, a palm, or a face.

9. The method of claim 1, further comprising:
determining, by the server, a scheme of generating the user's authentication code by using a sensor located in the vehicle,
wherein the mobile terminal is configured to generate the user's image according to the determined scheme.

10. The method of claim 1, further comprising:
outputting, by the vehicle and based on the passenger's image not matching the user's authentication code, notification information to the passenger to generate a new passenger's image to be matched with the authentication code, wherein the notification information is outputted in at least one of a visual, an auditory, or a tactile manner.

11. The method of claim 1, wherein the mobile terminal is configured to display the passenger's image received through the server on the screen of the mobile terminal.

12. The method of claim 1, further comprising:
displaying, by the vehicle, a predetermined password input by the passenger on a display of the vehicle based on the passenger's image not matching the user's authentication code,
wherein a screen shown on a display of the mobile terminal comprises a keypad that is configured to receive input of a password.

13. The method of claim 12, further comprising:
granting, by the vehicle, the passenger permission to use the vehicle based on the input password matching the predetermined password.

14. The method of claim 1, further comprising:
updating, by the server, the user's authentication code by using the passenger's image based on the passenger's image matching the user's authentication code.

15. A vehicle terminal, comprising:
a plurality of sensors provided at a vehicle;
a communication device configured to perform communication with at least one of the plurality of the sensors; and
a processor that is configured to:
generate, based on information received from a server through the communication device and by using one of the sensors, a passenger's image that includes a passenger's personal information,
grant the passenger permission to use the vehicle based on the passenger's image matching a user's authentication code stored in the server,
disallow the passenger from using the vehicle based on the passenger's image not matching the user's authentication code, and
display, on a screen of a mobile terminal, a confirmation that the user has boarded the vehicle based on the passenger's image not matching the user's authentication code.

16. The vehicle terminal of claim 15, wherein the processor is configured to select one of the plurality of the sensors to vary the passenger's body part that is included in the passenger's image.

17. The vehicle terminal of claim 16, wherein the processor is configured to control the communication device to output guiding information to the passenger to move the passenger's body part to be included in the passenger's image, and wherein the guiding information is output to the passenger in at least one of a visual, an auditory, or a tactile manner.

18. The vehicle terminal of claim 17, wherein the passenger's body part comprises at least one of a fingerprint, an iris, a vein, a palm, or a face.

* * * * *